United States Patent
Land et al.

(10) Patent No.: US 6,213,521 B1
(45) Date of Patent: Apr. 10, 2001

(54) QUICK RELEASE AND BAYONET CONNECTOR FOR A SUCTION CUP

(75) Inventors: Jacob Van't Land, Ypsilanti; Alfred P. Herbermann, Ann Arbor, both of MI (US)

(73) Assignee: Syron Engineering & Manufacturing Corporation

( * ) Notice: Subject to any disclaimer, the term of this patent is extended or adjusted under 35 U.S.C. 154(b) by 0 days.

(21) Appl. No.: 08/946,861

(22) Filed: Oct. 8, 1997

Related U.S. Application Data

(60) Provisional application No. 60/027,421, filed on Oct. 8, 1996.

(51) Int. Cl.[7] .................................................. F16L 3/00
(52) U.S. Cl. ............................ 285/61; 285/82; 285/317; 285/361
(58) Field of Search .................... 285/360, 361, 285/376, 82, 401, 317, 402, 375, 161, 79; 294/64.1; 248/362; 269/21; 271/14

(56) References Cited

U.S. PATENT DOCUMENTS

| | | | |
|---|---|---|---|
| 815,476 | * 3/1906 | Schaffer | 285/79 X |
| 1,117,762 | * 11/1914 | Barcus | 285/375 X |
| 1,415,053 | * 5/1922 | Robertson | 285/402 |
| 1,842,449 | * 1/1932 | Gray | 285/375 X |
| 2,647,768 | * 8/1953 | Exton | 285/376 |
| 2,757,682 | * 8/1956 | Nicks | 285/375 X |
| 3,538,950 | * 11/1970 | Porteners | 285/376 |
| 4,438,884 | * 3/1984 | O'Brien | 285/376 |
| 4,732,415 | * 3/1988 | Martin et al. | 285/360 |
| 5,213,385 | * 5/1993 | Nagai et al. | 294/64.1 |
| 5,582,450 | * 12/1996 | Nagai et al. | 294/64.1 |
| 5,626,378 | * 5/1997 | Puhl et al. | 294/64.1 |
| 5,876,031 | * 3/1999 | Ohkoda et al. | 271/14 |

* cited by examiner

*Primary Examiner*—Dave W. Arola
(74) *Attorney, Agent, or Firm*—Carlson, Gaskey & Olds

(57) ABSTRACT

The present invention relates to a quick release mount for a suction cup and a locking member for releasably locking the suction cup within a housing. The suction cup mount includes a bayonet coupling which is attached to the suction cup. The bayonet coupling is received within a space located within the housing. The housing further includes a pair of semi-circular flanges for securing the bayonet coupling within the space. The locking member selectively engages the bayonet coupling when the bayonet coupling is moved from an unlocked position to a locked position. The housing also includes a button coupled to the locking member that can release the locking member from engagement with the bayonet coupling and permit unlocking of the bayonet coupling from the housing.

29 Claims, 3 Drawing Sheets

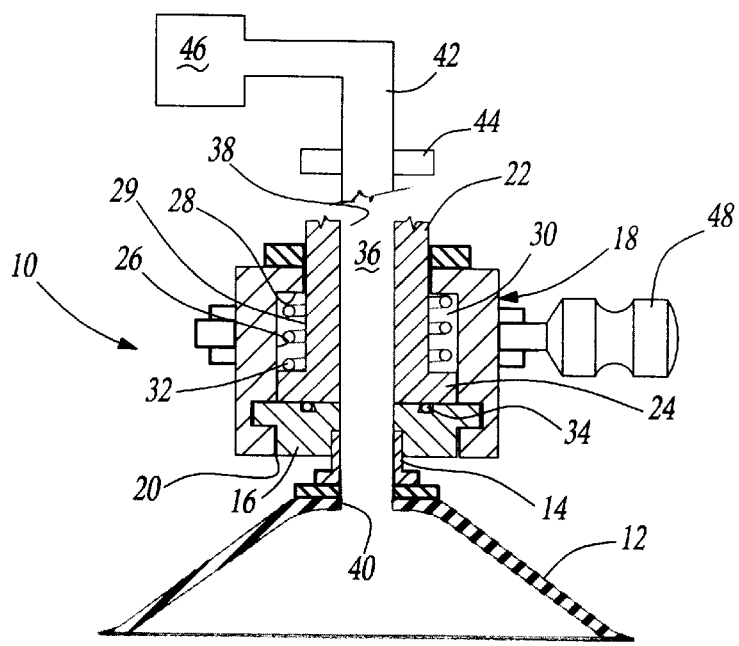
*Fig-1*
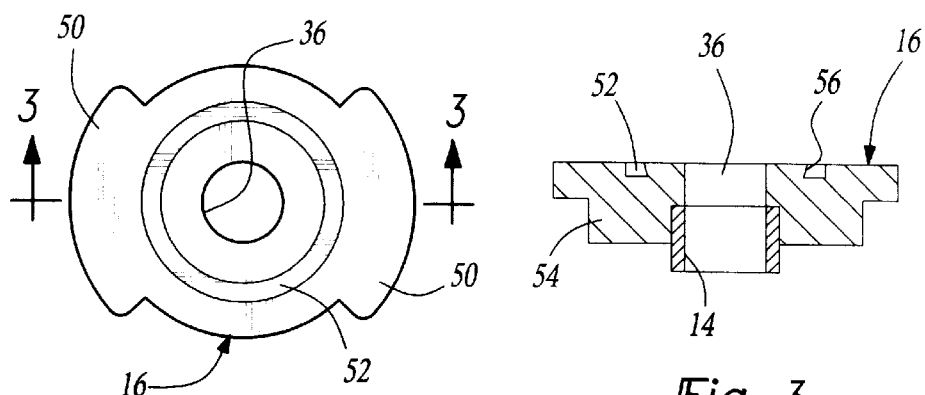
*Fig-2*  *Fig-3*
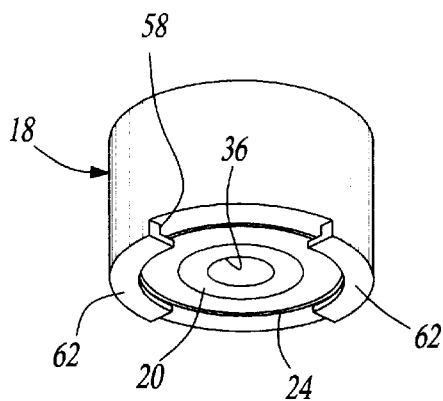
*Fig-4*

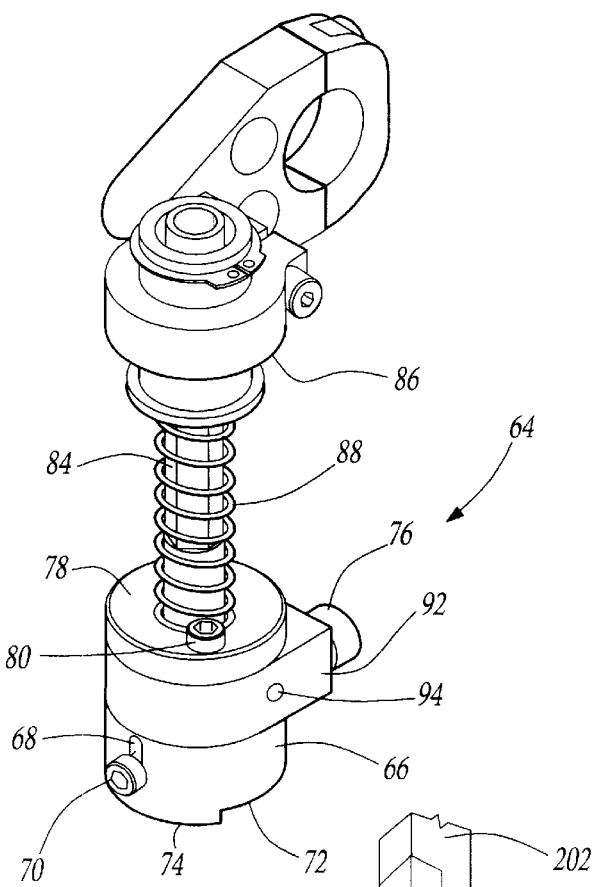
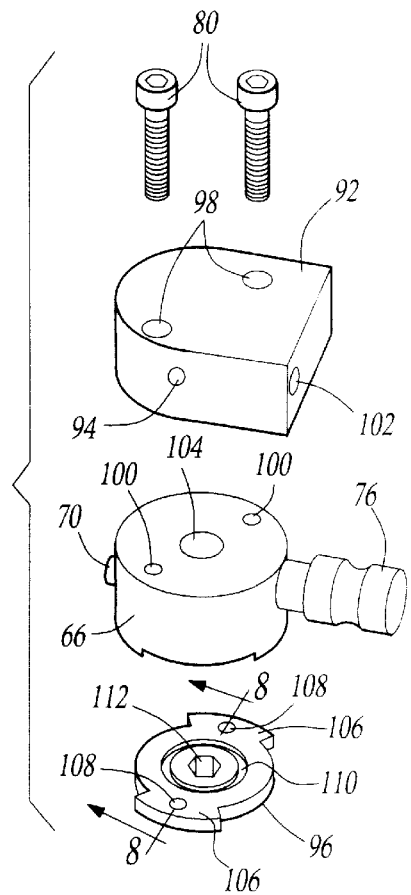
Fig-5
Fig-6
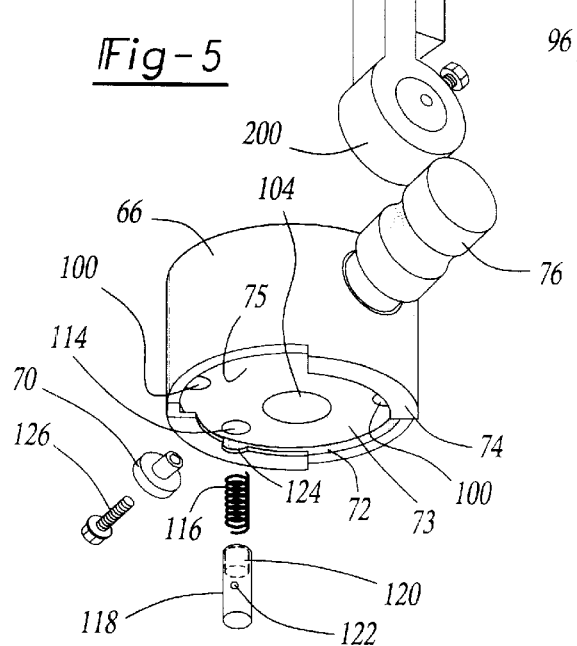
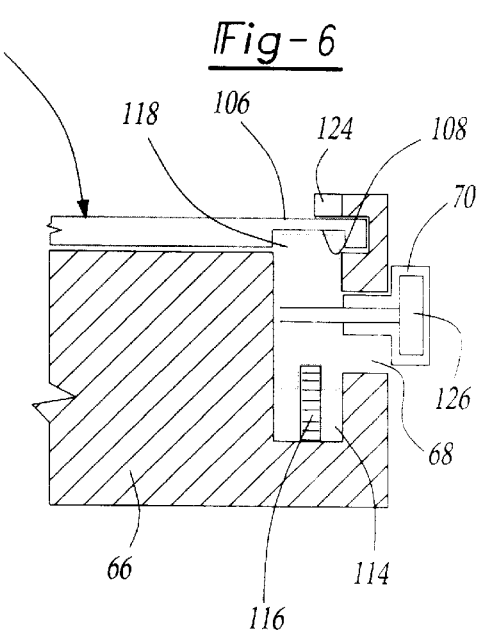
Fig-7A
Fig-7B

QUICK RELEASE AND BAYONET CONNECTOR FOR A SUCTION CUP

This application claims the benefit of U.S. Provisional Application No. 60/027,421, filed Oct. 8, 1996.

BACKGROUND OF THE INVENTION

This invention relates generally to suction cups and, more particularly, to a suction cup having a quick release mount.

Suction cups are used in a wide variety of manufacturing environments. Typically, they are used to hold and position a workpiece during transfer, assembly or machining operations.

Typically, suction cups are mounted to a housing that is attached to a robot arm or a workholding arm of a tooling machine. The suction cups need to be in an reproducible position to ensure that the workpiece is properly positioned during the machining or assembly process. To ensure that the workpiece is held in the proper location, the suction cup housing is usually secured in fixed position relative to the robot or workholding arm by a clamping mechanism. The suction cups occasionally need to be replaced with suction cups of a different shape to accommodate the contour of the workpiece. In addition, the suction cups frequently either break or need to be replaced due to wear. It is desirable that, the exchange or replacement be rapidly accomplished and that it not change the orientation of the suction cup housing relative to the arm. It is also desirable to incorporate a means for releasably locking the suction cup within the housing.

Therefore, it is desirable to provide a quick release suction cup mount that permits a user to easily exchange or replace suction cups without altering the orientation of the suction cup housing relative to the robot or workholding arm that it is associated with. In addition, it is further desirable to provide a releasable locking mechanism which further secures the suction cup mount to the housing.

SUMMARY OF THE INVENTION

In general terms, this invention provides a unique mounting mechanism and a locking feature that permits a suction cup to be rapidly mounted and locked in position to a housing and to be released from the housing rapidly.

Preferably, the suction cup is mounted to a bayonet coupling that is received within a space in a housing. The space is defined by a pair of semi-circular flanges mounted on a rim of the housing. The bayonet coupling fits within the rim and has a pair of ears that are received under the semi-circular flanges when the bayonet coupling is placed in the space and rotated 90 degrees from an unsecured position to a secured position. When the bayonet coupling ears are received under the semi-circular flanges, a locking member is biased into a recessed portion located in at least one of the ears and the locking member locks the bayonet coupling within the space in the housing. A button is coupled to the locking member and permits it to be moved out of engagement with the recess in the bayonet coupling thus allowing the rapid unlocking of the bayonet coupling from the housing in order to exchange or remove the suction cup. A central passage extends through the housing, bayonet coupling, and the suction cup to provide a vacuum through the suction cup. The vacuum secures the workpiece to the suction cup.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 1 is a cross-sectional side view of a quick release suction cup designed according to this invention;

FIG. 2 is a top plan view of the bayonet coupling shown in FIG. 1;

FIG. 3 is a cross-sectional side view of the bayonet coupling shown in FIG. 2 along lines 3—3;

FIG. 4 is a side perspective bottom view of the housing shown in FIG. 1;

FIG. 5 is a side view of a quick release suction cup designed according to this invention mounted to a robot arm;

FIG. 6 is an exploded side view of the venturi, the housing, and the bayonet coupling shown in FIG. 5;

FIG. 7A is an exploded side perspective bottom view of the housing shown in FIG. 6;

FIG. 7B shows locking pin structure;

DETAILED DESCRIPTION OF THE PREFERRED EMBODIMENT

Figure 8:
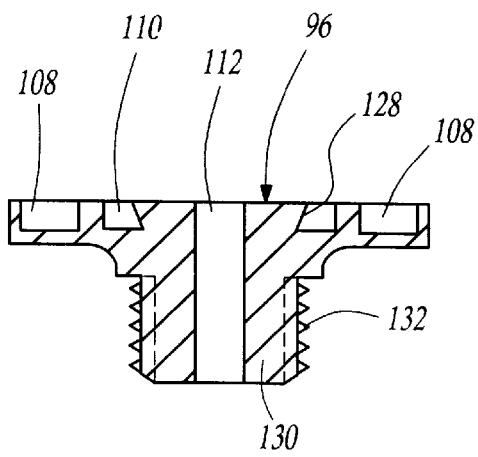
FIG. 8 is a cross-sectional side view of the bayonet coupling shown in FIG. 6 along lines 8—8.

FIG. 1 shows a quick release suction cup 10 including a suction cup 12 mounted to a bushing 14. The bushing 14 is fixed to a bayonet coupling 16. A housing 18 has a space 20 for receiving the bayonet coupling 16. A cylindrical plunger 22 having a rim 24 is received within the housing 18. An inner wall 26, an upper rim 28, an outer wall 29, and the rim 24 define a cylindrical spring space 30 within the housing 18. A spring 32 encircles the cylindrical plunger 26 and is trapped within the spring space 30. The spring 32 biases the cylindrical plunger 22 into the space 20. An annular seal 34 is located between the bayonet coupling 16 and the cylindrical plunger 22. Most preferably the annular seal 34 is an O-ring.

A central passage 36 extends through the housing 18, the cylindrical plunger 22, the annular seal 34, the bayonet coupling 16, and the suction cup 12. The central passage 36 has an upper end 38 and a lower end 40. A connector hose 42 and a connector 44 couple the upper end 38 of the central passage 36 to a vacuum source 46. The vacuum source 46 is of a conventional type well known in the art.

A clamping stem 48 is mounted to the housing 18. The clamping stem 48 is specifically shaped to be accommodated in a variety of clamps (not shown) that are well known in the art. The location and shape of the clamping stem 48 allows the housing 18 to be clamped in any position relative to the clamp. Additionally, the clamping stem 48 has the advantage of permitting the suction cup 12 and bayonet coupling 16 to be removed from the housing 18 while maintaining the positioning of the housing 18 relative to the clamp.

FIG. 2 is a top plan view of the bayonet coupling 16 which shows a pair of ears 50. An annular groove 52 in the bayonet coupling 16 receives the annular seal 34. The annular groove 52 and the annular seal 34 encircle the central passage 36.

FIG. 3 shows bushing 14 is secured to a nipple portion 54 of the bayonet coupling 16. The suction cup 12 is adhesively connected to the bushing 14. Optionally, the nipple portion 54 may include a set of external or internal threads (not shown) for securing the suction cup 12 to the bayonet coupling 16. The bushing 14 would be unnecessary if the nipple portion 54 includes a set of threads. The annular groove 52 includes an undercut 56 to provide a better seal when an O-ring is used as the annular seal 34.

FIG. 4 is a side perspective bottom view of the housing 18. A lower rim 58 extends from a housing base 60. The rim 24 of the cylindrical plunger 22 extends beyond the housing base 60 into the space 20 due to the bias of spring 32. A pair of semi-circular flanges 62 are mounted opposite each other to the lower rim 58. The lower rim 58 and the semi-circular flanges 62 define the space 20.

In use of this embodiment, the bayonet coupling 16 with the attached suction cup 12 and annular seal 34 is initially aligned with the ears 50 non-aligned to the semi-circular flanges 62. The bayonet coupling 16 is then inserted into the space 20 until the bayonet coupling 16 is flush against the housing base 60, thus moving the rim 24 to a position below flush with the housing base 60. The bayonet coupling 16 is then rotated ninety degrees from that unsecured position to a secured position wherein the ears 50 are aligned with the semi-circular flanges 62. In this position the bayonet coupling 16 is at a secured position relative to the housing 18. The bias of the spring 32 against the rim 24, of the cylindrical plunger 22 urges the plunger 22 into engagement with the annular seal 34 and additionally secures the bayonet coupling 16 within the space 20. The annular seal 34 also ensures that the central passage 36 is sealed between the lower end 40 and the upper end 38. The bayonet coupling 16 can be rapidly removed from the space 20 by rotating the bayonet coupling 16 ninety degrees to move the ears 50 out of alignment with the semi-circular flanges 62. An additional advantage of the bayonet coupling 16 with an annular groove 52 is that it prevents damage to the annular seal 34 when the bayonet coupling 16 is moved between the unsecured and secured positions.

When the bayonet coupling 16 is in the secured position, application of a vacuum through the vacuum source 46 will produce a vacuum at the lower end 40 of the central passage 36. Thus, a workpiece (not shown) will remain secured to the suction cup 12 so long as the vacuum is maintained. Additionally, as will be understood by one of ordinary skill in the art, the quick release suction cup could be utilized without a central passage 36. In such an embodiment, the workpiece would be secured to the suction cup 12 by utilizing the natural vacuum that is created when a sealed suction cup is flattened against a surface.

In FIG. 5, a side view of a preferred second embodiment of the quick release suction cup is shown generally at 64. A housing 66 includes a slot 68 for receiving a button 70. Slot 68 allows button 70 to move upwardly from the illustrated position. A rim 72 encircles the housing 66 and supports a pair of semi-circular flanges 74. A clamping stem 76 extends from the housing 66. As shown in FIG. 7A, clamping stem 76 receives a clamp 200, with the clamp 200 being fixed to a tool such as a moving arm 202. The clamp 200 and the moving arm 202 are shown somewhat schematically as they are known.

A clamping plate 78 and a pair of bolts 80 secure the housing 66 to a sliding bushing 82. The sliding bushing 82 is received on a post 84. Post 84 is secured to a robot arm mount 86. Robot arm mount 86 is known in the art. A spring 88 biases the clamping plate 78 away from the robot arm mount 86. A venturi 92 having an outlet hole 94 can optionally be accommodated between the clamping plate 78 and the housing 66 to provide a venturi effect vacuum as described below.

FIG. 6 is an exploded side view of the venturi 92, the housing 66, and the bayonet coupling 96 shown in FIG. 5. The venturi 92 and the housing 66 both include a pair of holes 98 and 100, respectively, for receiving the bolts 80 that secure the clamping plate 78 to the venturi 92 and the housing 66. A plug 102 is located in the venturi 92. A central passage 104 extends through the housing 66. The bayonet coupling 96 includes a pair of ears 106 opposite each other. Each of the ears 106 includes a recess 108. An annular groove 110 encircles a central passage 112 that extends through the bayonet coupling 96. An O-ring (not shown) is accommodated in the annular groove 110. As will be appreciated by one of ordinary skill in the art, another type of annular seal other than an O-ring could be utilized.

FIG. 7A is an exploded bottom view of the housing 66. The rim 72, a housing base 75, and the semi-circular flanges define a space 73 for receiving the bayonet coupling 96. A pin hole 114 in the housing 66 accommodates a spring 116 and a pin 118. The pin 118 includes a recess 120 for receiving the spring 116 and a through hole 122 perpendicular to the longitudinal axis of the pin 118. A cut out 124 in one of the semi-circular flanges 74 allows the spring 116 and the pin 118 to be initially inserted into pin hole 114. A lock pin 126 extends through the button 70 and into through hole 122 to couple the button 70 to the pin 118. The pin 118 in combination with the spring 116 serves as a locking member as discussed below.

FIG. 8 is a cross-sectional side view of the bayonet coupling 96 shown in FIG. 6 along lines 8—8. The annular groove 110 includes an undercut 128 to provide a better seal between the bayonet coupling 96 and the housing 66 when an O-ring is used as the annular seal (not shown). A nipple portion 130 of the bayonet coupling 96 includes a set of threads 132. The suction cup 12 (not shown) is secured to the bayonet coupling 96 by the threads 132. As will be understood by one of ordinary skill in the art, the suction cup 12 might also be secured to the nipple portion 130, in the absence of the threads 132, using a conventional adhesive.

Figure 9:
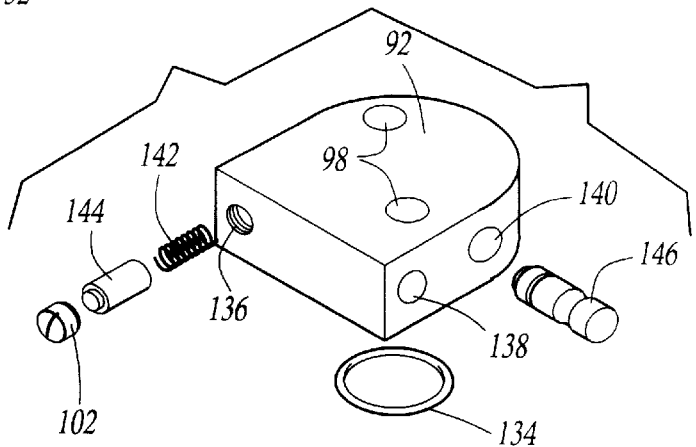
FIG. 9 is an exploded side perspective view of the venturi shown in FIG. 6 and an annular seal.

In FIG. 9, an exploded side perspective view of the venturi 92 and an annular seal 134 is shown. The venturi 92 includes a plug hole 136, a bypass hole 138 and a venturi cartridge hole 140. A plug spring 142 and a bypass valve 144 are secured within the plug hole 136 by the plug 102. A venturi cartridge 146 is accommodated in the venturi cartridge hole 140.

Figure 10:
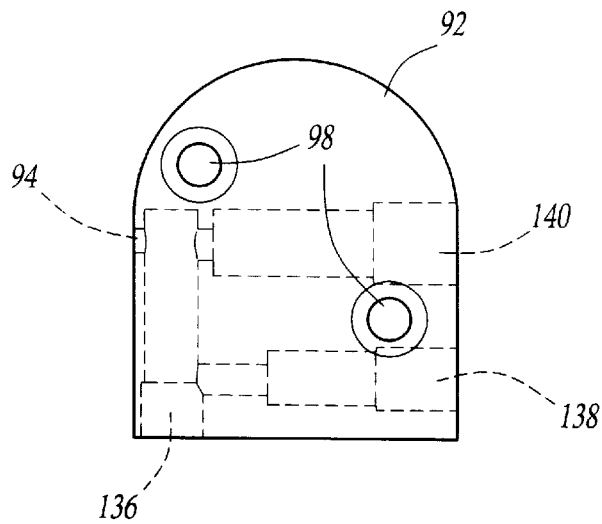
FIG. 10 is a top plan view of the venturi shown in FIG. 6.

FIG. 10 is a top plan view of the venturi 92 shown in FIG. 9. The venturi cartridge hole 140 extends through the venturi 92 and communicates with the outlet hole 94. The plug hole 136 is oriented perpendicularly to the venturi cartridge hole 140 and also communicates with the outlet hole 94. The bypass hole 138 is oriented parallel to the venturi cartridge hole 140 and perpendicular to the plug hole 136. The bypass hole 138 communicates with the plug hole 136. The venturi cartridge hole 140 is in communication with the central passage 104 of the housing 66 and the central passage 112 of the bayonet coupling 96. The venturi 92 operates in a conventional fashion as is well known by those of ordinary skill in the art and its design forms no portion of the novel features of this invention. Briefly, a flow of a fluid or a gas is passed through the venturi cartridge 146 and the outlet hole 94. A venturi effect vacuum is produced within central passages 104 and 112, thus enabling the suction cup 12 to secure a workpiece. Discontinuing the flow through the venturi cartridge 146 and subsequently introducing a flow through bypass hole 138 forces bypass valve 144 away from plug 102 and closes outlet 94, thus forcing the flow through central passages 104 and 112. The flow through central passages 104 and 112 forces the workpiece off the suction cup 12.

In use of this embodiment of the quick release suction cup, the bayonet coupling 96 is initially oriented with the ears 106 positioned non-aligned to the semi-circular flanges 74. FIGS. 7A and 7B show the locking feature of pin 118. The pin 118 extends beyond the housing base 75 and into space 73. As the bayonet coupling 96 is moved into space 73 until it is flush with housing base 75, the bayonet coupling 96 forces pin 118 into pin hole 114 until pin 118 is flush with the housing base 75. This is the unlocked position. Rotation of the bayonet coupling 96 ninety degrees aligns the ears 106 with the semi-circular flanges 74 and permits pin 118 to be biased by spring 116 into one of the recess 108 in the ears 106 of the bayonet coupling 96, thus locking the bayonet coupling 96 in a locked position in the housing 66. Moving button 70 in slot 68, upwardly as shown in FIG. 5, or away from housing base 75 withdraws pin 118 from recess 108. Subsequent rotation of the bayonet coupling 96 ninety degrees enables removal of the bayonet coupling 96 from the housing 66.

As discussed above, the venturi 92 is an optional means for producing a vacuum within central passages 104 and 112. If the venturi 92 is not utilized, a vacuum can be produced within the central passages 104 and 112 by means of a conventional connection connecting the central passage 104 in the housing 66 to a vacuum source.

This embodiment also includes the clamping stem 76. The clamping stem 76 permits the housing 66 to be held at any position relative to a clamp (not shown) of the type known in the art. In a situation where the clamping plate 78 is not used to secure the housing 66 to a post 84, the clamping stem 76 is used to secure the housing 66 to a clamp. The clamping stem 76 can be used with or without the venturi 92. As discussed above, the clamping stem 76 permits the bayonet coupling 96 to be moved between the unsecured and the secured locked positions within the housing 66 while maintaining the position of the housing 66 relative to the clamp. This allows the suction cup 12 to be removed and replaced, while maintaining a fixed position in space.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A quick release suction cup comprising:
   a suction cup attached to a bayonet coupling, said bayonet coupling including a pair of semi-circular ears opposite each other; and
   a housing including a lower rim having a pair of semi-circular flanges mounted opposite each other on said lower rim, said lower rim and said pair of semi-circular flanges defining a space for receiving said bayonet coupling, said bayonet coupling movable within said space relative to said housing between a secured and an unsecured position, said pair of semi-circular ears aligned with said pair of semi-circular flanges when said bayonet coupling is at said secured position.

2. A quick release suction cup comprising:
   a suction cup attached to a bayonet coupling; and
   a housing having a space for receiving said bayonet coupling, said bayonet coupling movable within said space relative to said housing between a secured and an unsecured position to secure said suction cup, and provide a connection to a suction source, said housing further including a spring and a plunger moveable within said space, said spring biasing said plunger into engagement with said bayonet coupling when said bayonet coupling is in said space thus maintaining said bayonet coupling at said secured position.

3. A quick release suction cup as recited in claim 2, wherein said housing further includes a stem shape received in a clamp, said clamp holding said housing in a fixed position relative to said clamp.

4. A quick release suction cup as recited in claim 2, further comprising a vacuum source and a central passage through said suction cup, said bayonet coupling, and said housing, said central passage in communication with said vacuum source.

5. A quick release suction cup as recited in claim 4, further including an annular seal, said annular seal disposed around said central passage and located between said bayonet coupling and said housing, said seal sealing around said central passage between said bayonet coupling and said housing.

6. A quick release suction cup as recited in claim 5, wherein said annular seal comprises an O-ring.

7. A quick release suction cup as recited in claim 6, wherein said bayonet coupling further includes an annular groove for receiving said O-ring.

8. A quick release suction cup as recited in claim 2, wherein said bayonet coupling further includes a set of threads, said threads attaching said suction cup to said bayonet coupling.

9. A quick release suction cup comprising:
   a suction cup attached to a bayonet coupling, said bayonet coupling including a pair of semi-circular ears opposite each other;
   a housing including a lower rim having a pair of semi-circular flanges mounted opposite each other on said lower rim, said lower rim and said pair of semi-circular flanges defining a space for receiving said bayonet coupling, said bayonet coupling movable within said space relative to said housing between an unlocked and a locked position; and a locking member adjacent one of said semi-circular flanges for releasably engaging said bayonet coupling at said locked position thereby maintaining said bayonet coupling at said locked position.

10. A quick release suction cup comprising:

a suction cup attached to a coupling having a pair of semi-circular ears opposite each other;

a housing having a clamping stem and a space defined by a lower rim and a pair of semi-circular flanges attached to said lower rim for receiving said coupling in an unsecured position and a secured position;

said clamping stem receivable in a clamp and said clamping stem securing said housing in a fixed position relative to said clamp; and said clamping stem maintaining said fixed position when said coupling is moved between said secured position and said unsecured position such that said suction cup can be removed from said housing and reattached to said housing at the same position.

11. A quick release suction cup comprising:

a suction cup attached to a bayonet coupling;

a housing having a space for receiving said bayonet coupling, said bayonet coupling movable within said space relative to said housing between an unlocked and a locked position to secure said suction cup and provide a connection to a suction source; and a locking member for releasably engaging said bayonet coupling at said locked position thereby maintaining said bayonet coupling at said locked position, a clamping plate securing said housing to a robot arm mount.

12. A quick release suction cup as recited in claim 11, wherein said locking member comprises a pin.

13. A quick release suction cup as recited in claim 12, wherein said housing further includes a spring and said bayonet coupling further includes one recess in at least one of said semi-circular ears, said spring biasing said pin into said recess when said bayonet coupling is at said locked position.

14. A quick release suction cup as recited in claim 11, further including a button coupled to said locking member, said button for moving said locking member out of engagement with said bayonet coupling, thus permitting said bayonet coupling to move from said locked position to said unlocked position.

15. A quick release suction cup as recited in claim 11, wherein said housing further includes a stem received in a clamp, said clamp holding said housing in a fixed position relative to said clamp.

16. A quick release suction cup as recited in claim 11, further including a vacuum source and a central passage through said housing, said bayonet coupling, and said suction cup, said central passage in communication with said vacuum source.

17. A quick release suction cup as recited in claim 16, further including an annular seal, said annular seal disposed around said central passage and located between said bayonet coupling and said housing, said seal sealing around said central passage between said bayonet coupling and said housing.

18. A quick release suction cup as recited in claim 17, wherein said annular seal comprises an O-ring.

19. A quick release suction cup as recited in claim 18, wherein said bayonet coupling further includes an annular groove for receiving said O-ring.

20. A quick release suction cup as recited in claim 16, further including a venturi, said venturi secured to said housing and in communication with said central passage, said venturi providing a vacuum source to said central passage.

21. A quick release suction cup as recited in claim 20, further including an annular seal disposed around said central passage and between said venturi and said housing.

22. A quick release suction cup comprising:

a suction cup attached to a coupling;

a housing having a clamping stem and a space for receiving said coupling in an unsecured position and a secured position;

said clamping stem received in a clamp and securing said housing in a fixed position relative to said clamp; and said clamping stem maintaining said fixed position when said coupling is moved between said secured position and said unsecured position such that said suction cup can be removed from said housing and reattached to said housing at the same position.

23. A quick release suction cup as recited in claim 22, wherein said coupling further includes an annular groove for receiving an annular seal, said annular groove permitting movement of said coupling between said secured position and said unsecured position while maintaining the integrity of said annular seal.

24. A quick release suction cup comprising:

a suction cup attached to a bayonet coupling;

a housing having a space for receiving said bayonet coupling, said bayonet coupling movable within said space relative to said housing between a secured and an unsecured position to secure said suction cup, and provide a connection to a suction source; and said housing further including a stem received in a clamp, said clamp holding said housing in a fixed position relative to said clamp.

25. A quick release suction cup comprising:

a suction cup attached to a bayonet coupling;

a housing having a space for receiving said bayonet coupling, said bayonet coupling movable within said space relative to said housing between a secured and an unsecured position to secure said suction cup, and provide a connection to a suction source; and said bayonet coupling further includes a set of threads, said threads attaching said suction cup to said bayonet coupling.

26. A quick release suction cup comprising:

a suction cup attached to a bayonet coupling;

a housing having a space for receiving said bayonet coupling, said bayonet coupling movable within said space relative to said housing between a secured and an unsecured position to secure said suction cup, and provide a connection to a vacuum source;

a central passage through said suction cup, said bayonet coupling, and said housing, said central passage in communication with said vacuum source, an annular seal disposed around said central passage and between said bayonet coupling and said housing; and said annular seal comprises an O-ring.

27. A quick release suction cup comprising:

a suction cup attached to a bayonet coupling;

a housing having a space for receiving said bayonet coupling, said bayonet coupling movable within said space relative to said housing between an unlocked and a locked position to secure said suction cup and provide a connection to a suction source;

a locking member for releasably engaging said bayonet coupling at said locked position thereby maintaining said bayonet coupling at said locked position;

said housing including a stem received in a clamp, said clamp holding said housing in a fixed position relative to said clamp.

28. A quick release suction cup comprising:

a suction cup attached to a bayonet coupling;

a housing having a space for receiving said bayonet coupling, said bayonet coupling movable within said space relative to said housing between an unlocked and a locked position to secure said suction cup and provide a connection to a vacuum source; and a locking member for releasably engaging said bayonet coupling at said locked position thereby maintaining said bayonet coupling at said locked position;

including a central passage through said housing, said bayonet coupling, and said suction cup, said central passage in communication with said vacuum source; and an annular seal disposed around said central passage between said bayonet coupling and said housing, said annular seal being an O-ring.

29. A quick release suction cup comprising:

a suction cup attached to a bayonet coupling;

a housing having a space for receiving said bayonet coupling, said bayonet coupling movable within said space relative to said housing between an unlocked and a locked position to secure said suction cup and provide a connection to a vacuum source;

a locking member for releasably engaging said bayonet coupling at said locked position thereby maintaining said bayonet coupling at said locked position;

a central passage through said housing, said bayonet coupling, and said suction cup, said central passage in communication with said vacuum source; and said vacuum source comprises a venturi.

* * * * *